United States Patent [19]

Hein

[11] 4,173,364
[45] Nov. 6, 1979

[54] CLAMP ASSEMBLY FOR HIGH PRESSURE DIAPHRAGM TEST CELLS

[75] Inventor: Wolfgang Hein, Dassel, Fed. Rep. of Germany

[73] Assignee: Carl Schleicher & Schull, Einbeck, Fed. Rep. of Germany

[21] Appl. No.: 827,428

[22] Filed: Aug. 24, 1977

[30] Foreign Application Priority Data

Apr. 18, 1977 [DE] Fed. Rep. of Germany ....... 2717048

[51] Int. Cl.² ............................................. E05C 19/00
[52] U.S. Cl. .............................................. 292/256.67
[58] Field of Search ............. 220/24; 292/256, 256.67, 292/256.69, 256.65, 251, 212

[56] References Cited

U.S. PATENT DOCUMENTS

| 1,826,947 | 10/1931 | Nelson | 292/256.67 X |
| 1,958,923 | 5/1934 | Mohler | 292/256.67 X |
| 3,817,564 | 6/1974 | Baldwin et al. | 292/256.67 |

FOREIGN PATENT DOCUMENTS 26073 2/1932 Netherlands ......................... 292/256.67

*Primary Examiner*—Richard E. Moore
*Attorney, Agent, or Firm*—Burns, Doane, Swecker & Mathis

[57] ABSTRACT

A high pressure diaphragm test cell includes upper and lower parts. A clamp assembly is provided which enables the cell parts to be clamped together or released by a single person. The clamp assembly includes a carrier frame connected to the upper cell part. A vertical carrier pin extends downwardly from the carrier frame. A pair of clamp ring parts are connected to the carrier pin for rotation in a horizontal plane. A fastener extends tangentially relative to the free ends of the clamp parts for tightening the clamp parts against the cell parts. The fastener includes a screw rotatably carried in one of the clamp parts and threaded into the other clamp part. The screw has stop plates which engage the one clamp part to aid in separating the clamp parts when the cell parts are to be disassembled.

10 Claims, 2 Drawing Figures

CLAMP ASSEMBLY FOR HIGH PRESSURE DIAPHRAGM TEST CELLS

BACKGROUND AND OBJECTS OF THE INVENTION

The invention relates to high pressure diaphragm test cells and more particularly to a clamping arrangement for securing the cell components together to resist high pressures.

High pressure membrane or diaphragm test cells serve for the filtration or for the inverted osmosis (in short, for the processing) of liquids under pressure in the area of 100 bar. They serve especially for use in the laboratory for testing of separating membranes or for the experimental preparations or model processings of liquids. Customarily such test cells have an upper part and a lower part. In the upper part, there is a pressure chamber for the medium that is to be processed. Furthermore, the upper part has an inlet for the medium that is to be processed and an outlet for the substance that is retained. Sometimes additional structure is provided in the upper part of the cell. In the lower part of the cell, there customarily is a filter support and the filter which, in most cases, is a multilayer filter; and possibly sealing elements are provided. Moreover, the lower part has a drainage mechanism for the permeate. Upper part and lower part are customarily made of high grade stainless steel and correspondingly have considerable weight.

In connection with such cells, it is important that the upper part and the lower part of the cell should be released as easily as possible from one another, as well as connected with one another in a high pressure sealing manner, with few manipulations.

For connecting the cell parts, wedge flange connections with bipartite clamping rings have particularly proven themselves. Such a wedge flange clamping closure has been known for example from German utility patent No. 72 25 662. In particular, on the lower part and on the upper part of the cell, wedge flanges are provided which may be forced against one another by a bipartite clamping ring having a trapezoid spaced ring groove. The parts of the ring surround the cell flanges so that the ring groove wedges the flanges together. The clamping of the ring parts is produced by two tightening screws situated tangentially relative to the clamp parts.

It is disadvantageous in the case of heretofore known devices employing such closing mechanism that after releasing of the tightening screws by means of an auxiliary tool, the wedged parts of the clamping ring must be forced apart and the cell then falls apart into three or four individual parts, namely into the upper cell part, the lower cell part and the two parts of the clamping ring. For the opening and closing of the cell which takes place several times daily in the laboratory, therefore, the cooperation of a plurality of persons is required for this operation if damage to the cell is to be avoided.

In the case of one previously proposed cell arrangement, one of the two parts of the clamping ring is mounted on a rear support wall. Even in the case of this arrangement, however, more than two hands are required to prevent the lower part from falling during the releasing of the tightening screws and the forcing away of the front part of the tightening ring.

Furthermore, pressure filtration cells have been known which have an upper part, a lower part and clamping elements interconnecting the two parts releasably. These pressure filtration devices are supported with their lower part on tripods. After the release of the clamping elements, a falling apart of the cell will be avoided through the fact that the upper part is still supported and carried just as it was before, by the lower part. It is disadvantageous in the case of opening of these cells however, that the upper part, which is connected with the discharge pipes and the supply pipes, usually pressure pipes, must be lifted from the lower part. This does not merely lead to inconveniences in the handling of the device but also presents inconveniences and limitations in the design of the pressure pipes.

In view of this status of the prior art, the present invention is based on the object of creating an apparatus for holding and closing the parts of a high pressure membrane test cell of the type previously discussed, which makes possible convenient and rapid handling of the cell by a single person and makes possible the use of rigid, locally fixed pressure lines in connection with the cell.

BRIEF DESCRIPTION OF A PREFERRED EMBODIMENT OF OF THE INVENTION

For the solution of this object, the invention preferably proposes an apparatus for a high pressure membrane test cell of the initially mentioned type which apparatus serves as both a holder and a closure. The apparatus comprises a carrier frame adapted to be fixed to a stationary support. A securing mechanism secures the carrier frame to an upper cell part. A vertical carrier pin is mounted on the carrier frame and extends downwardly therefrom. First and second clamp ring parts are mounted at their inner ends to a lower end of the carrier pin for free swinging movement in a horizontal plane. The clamp ring parts each includes clamp surfaces for engaging wedge flanges of the cell parts. A fastening mechanism engages front ends of the clamp ring parts and extends tangentially relative thereto for forcing the clamp ring parts toward one another to press the cell parts firmly against one another.

The invention provides an apparatus which consists of a locally fixed, rigid carrier frame for the upper part of the cell, as well as clamp elements articulated to this holder and supported in a stable manner, for the sealing connection of the upper cell part with the lower cell part. During opening of the cell, it is merely necessary for the user to hold a single removable part to be taken off, namely the lower part of the cell. All other parts, namely the upper part of the cell and all parts of the clamp element are held locally fixed on the main carrier frame which is attached in a customary manner such as a tripod, on a tripod wall or in the wall or in some other manner. To disassemble the cell, the user merely needs to release with one hand the single clamping screw of the clamp, while at the same time he supports with his other hand the bottom of the lower part of the cell. In doing so he need not fear the falling of any parts of the cell. Also in the case of this type of rigid, locally fixed attachment of the upper part of the cell, rigid pressure lines may be used for the inlet and discharge of the medium that is to be processed. This provides not only an increase of safety and reliability of the device, but also a saving in costs in the case of the erection of test stands of the type in question for purposes of processing.

According to a further aspect of the invention, the carrier frame is attached preferably to the top side of the upper part of the cell. This type of attachment will guarantee that the jacket of the upper part of the mostly cylindrically developed cell is freely available for purposes of connection. This is particularly of significance in the case of the tangential inlet of the feed into the pressure chamber of the cell which is of increasing prevalance. Especially in this case, the horizontal carrier is attached preferably to the upper part of the cell by way of a screw connection. The location and distribution of the screw connections has preferably been developed so that the upper cell part, in relation to a radial plane, may be attached in different angular positions in relation to the carrier frame. This will facilitate for the user the erection of experimental stands, especially in the case of connections on the jacket of the upper cell part, since the user may place such connections selectively forward, rearward, to the right or to the left in relation to the servicing side or the carrier frame direction.

According to a further aspect of the invention, the clamping screw, with its threaded shaft, is threaded only to one of the two parts of the bipartite clamping ring. At the other clamping ring part, it is mounted freely rotatable in a correspondingly disposed bore, but axially fixedly relative thereto. This kind of mounting of the clamping screw guarantees that the two parts of the clamping ring are automatically forced apart during the loosening of the screw. Also as a result, loss of the clamping screw or removal thereof from the clamping ring is prevented.

The clamping screw preferably comprises a screw part of which is free of any thread, whereby on this threadless part bevels have been provided for the engagement of a fork wrench.

THE DRAWINGS

The invention will be explained in more detail in the following paragraphs on the basis of a preferred embodiment in connection with the accompanying drawings in which:

FIG. 1 is a side view, partly in vertical cross-section, of an embodiment of the invention; and FIG. 2 depicts the embodiment shown in FIG. 1 in plan view with both clamping parts visible.

DETAILED DESCRIPTION OF THE PREFERRED EMBODIMENT

Figure 1:
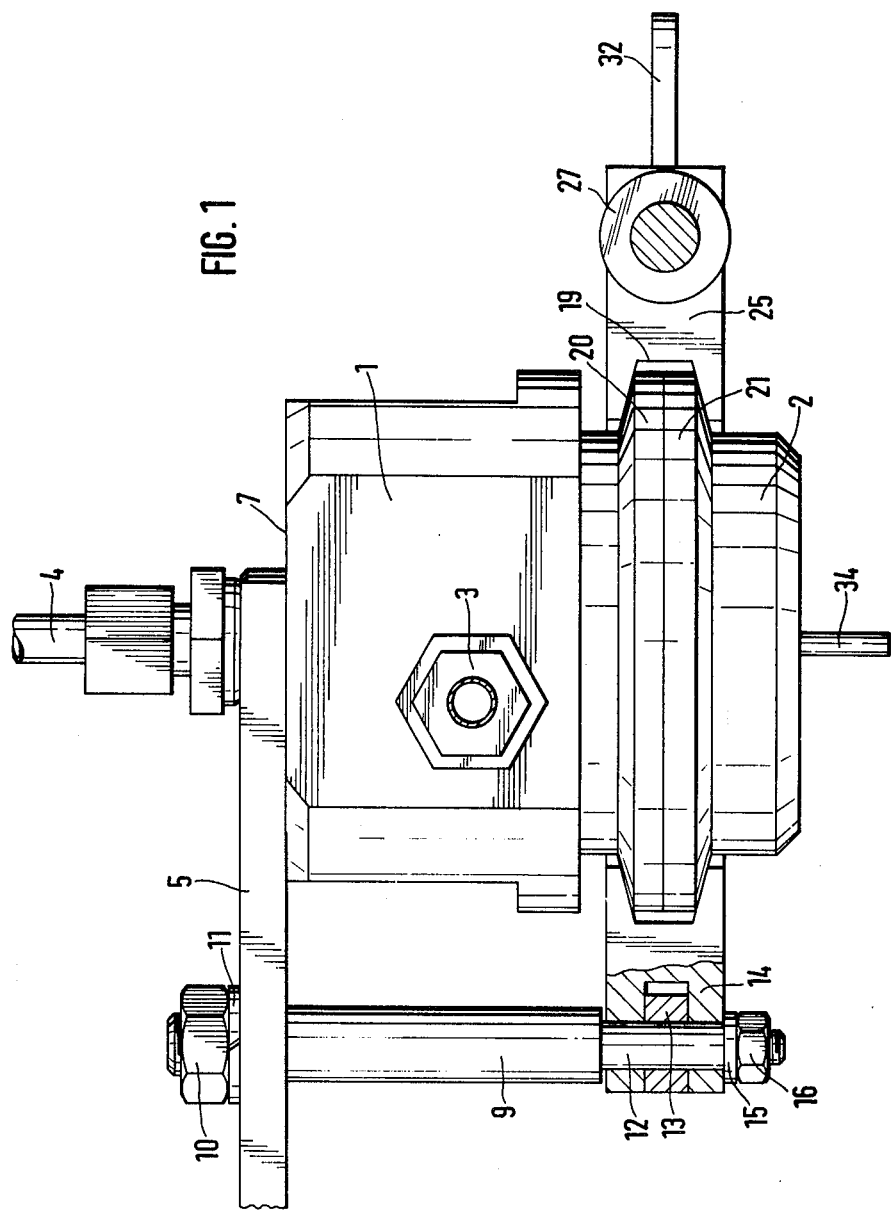
Figure 2:
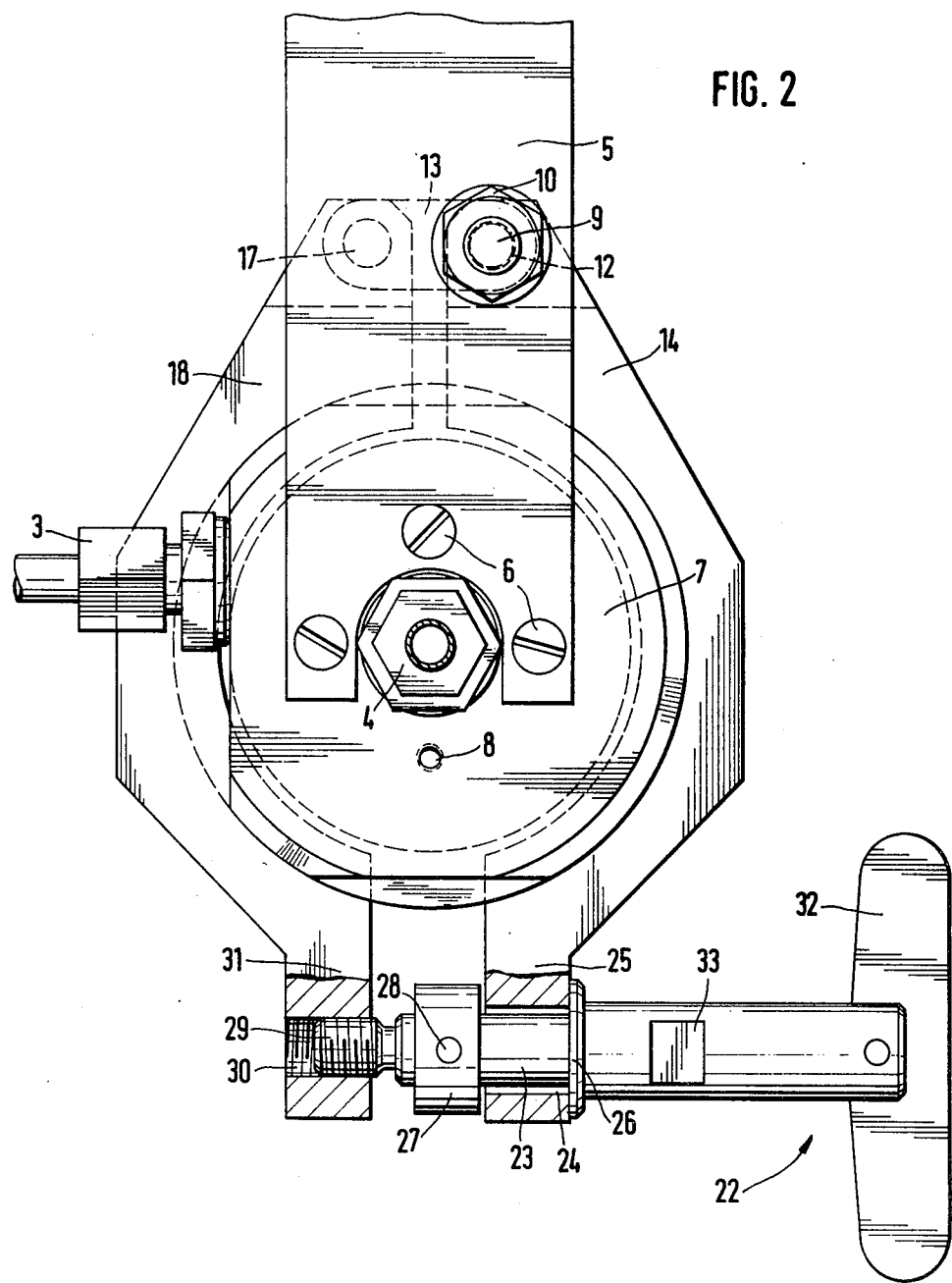

In FIGS. 1 and 2 a cylindrical high pressure membrane test cell has been shown which is made from high-grade steel for operating pressures in the area of 100 bar. The cell comprises an upper part 1 and a lower part 2. The upper part 1 has a tangentially oriented inlet 3 for the medium that is to be processed. At its upper side, the upper part has an axial discharge 4 for the retained substance. A horizontal carrier frame comprising a flat carrier plate 5 has been attached by countersunk screws 6 on the upper side 7 of the upper part 1. In its front area, the horizontal carrier plate 5 is fork-shaped and partially encircles the discharge 4.

The upper part 1 is screwed together with the horizontal carrier plate 5 by three screws 6 all spaced by 90°. The screws are screwed in from above into threaded bores 8 in the horizontal carrier plate 5. These threaded bores are also formed into the upper side 7 of the cell 1. Altogether, four threaded bores 8 are displaced by 90° in relation to one another and lying on a circle, are provided on the upper side 7 of the cell 1. This makes possible to attach the upper part 1 to the horizontal carrier 5 in four different angular positions relative to the longitudinal axis of the horizontal carrier plate. As a result, the inlet 3 shown on the left-hand side in FIG. 2 may be shifted to the right-hand side by unscrewing and screwing-in again of only three screws.

On the horizontal carrier plate 5, furthermore, a vertical carrier 9 comprising a round pin has been attached. The vertical carrier pin 9 extends from the horizontal carrier plate 5 downwardly and is disposed beside the cell 1, 2. The longitudinal axis of the pin 9 extends parallel to the longitudinal axis of the cell 1, 2. In the preferred embodiment described here, the vertical carrier pin 9 is fastened by means of a nut 10 and a washer 11 to the horizontal carrier plate 5.

The lower part of the vertical carrier pin 9 comprises an axle journal 12. Axially installed onto the journal 12 for rotation in a horizontal plane are a horizontal tab 13 and a clamp part or half ring 14. The tab 13 and the half ring 14 are axially fixed by a washer 15 and a nut 16 mounted on the journal 12. The horizontal tab 13 is thus articulated at one of its ends on the axle journal 12. At its other end the tab 13 carries an axial journal 17 which is disposed closely adjacent the axle journal 12 in parallel relationship. On the axle journal 17 a second clamping half ring 18 is attached freely swivelable in the horizontal plane and is axially fixed.

The two clamping half rings 14, 18 each have a trapezoidal ring groove 19 disposed on a radially inner portion thereof. These grooves cooperate with correspondingly shaped annular wedge flanges 20 and 21 on the upper and lower cell parts 1, 2 respectively. Thus, rear ends of the two clamp half rings 14, 18 are mounted on swiveling axles 12, 17 which are fixed in relation to one another by a horizontal tab 13. As will be discussed, the front ends of the clamp half rings can be forced together by a clamping screw arrangement 22. As a result, the upper cell part 1 and the lower cell part 2 are forced sealingly against one another by the cooperating wedge surfaces of the trapezoidal ring groove 19 and the inclined wedge surfaces of the wedge flanges 20 and 21.

The clamping screw arrangement 22 includes a shaft with a section 23 free of thread. This section 23 is mounted freely rotatably in a bore or eye 24 formed in an extension 25 of the first clamping half ring 14. The shaft of the clamping screw arrangement 22 is limited in its axial shifting capability by outside and inside stop plates 26 and 27. Preferably, the stop plate 27 is secured by a releasable pin 28 on the shaft and thus cannot move axially relative to the shaft. As a result, an easy replacement of the clamping screw arrangement 22 is guaranteed. A portion 29 of the shaft of the clamping screw arrangement 22 projects beyond the inside stop plate 27 and is provided with an outside thread which engages with a corresponding inside thread in a bore 30 of an extension 31 of the second clamp half ring 18. In case of loosening of the clamping screw arrangement 22, the latter is forced out of the second clamp half ring 18 by the thread engagement of its shaft section 29. At the same time, the stop ring 27 disposed between the two projections 25 and 31 bears against the inside surface of the projection 25 of the first clamp half ring 14 and forces it away from the second clamp half ring 18. The two clamp ring halves 14 and 18 may thus be opened with minimal effort and without the use of additional tools, even if they had been wedged together as a result of very firm tightening.

The clamping screw 22 is provided with a handle 32 for normal operation. In case that the two clamping ring halves 14, 18 cannot be forced firmly enough against each other by means of the handle 32, or in case the opening force that may be created at the handle 32 is not sufficient for loosening the clamping screw arrangement 22, bevels 33 have been developed on the shaft of the clamping screw arrangement 22 between the outside stop plate 26 and the handle 32 which may receive a fork wrench for a greater intensity of turning power.

After opening of the clamping ring halves 14, 18, the lower cell part 2 with the discharge 34 for the permeate may be lifted off freely and without effort below the upper cell part 1. At the same time, all parts of the cell including the clamping elements, i.e. the upper cell part 1 with its pressure lines attached to it and two clamp ring halves 14, 18, and the clamping screw arrangement 22 remain secured to the horizontal carrier 5. The user merely needs to hold and remove the lower cell part 2.

As a result of the fact that the two clamp ring halves 14 and 18 are mounted releasably on the vertical carrier pin 9 by a screw connection 15, 16, they may be easily removed, inverted, and then resecured to the pin 9. As a result, the handle will be shifted by 180 degrees, enabling operation by left-handed persons.

As a result of such an inversion of the clamp ring halves 14, 18, the ring halves will lie asymmetrically in relation to the horizontal carrier plate 5. That is, the axle 17 will no longer be situated under the plate 5, but rather will be off to one side. If it is felt that this functionally impairs the clamp halves, a second bore may be provided in the horizontal plate 5 in alignment with the axle 17 in the FIG. 2 showing. This makes possible a relocation of the vertical carrier pin 9 in such a way that the clamp ring halves 14 and 18, even after re-orientation of the clamping screw 22, are again disposed symmetrically in relation to the horizontal carrier plate 5 for servicing by left-handers.

As a result of the present invention, the cell and the clamp are carried by the carrier frame. In order to disassemble the cell, the user merely grasps the lower cell part with one hand and unscrews the clamping screw with the other hand. There is no danger of any other parts falling down. Since the upper cell part is fixed and stationary, no foul-up of the pressure inlet and discharge conduits will occur.

The clamping screw is secured against axial withdrawal from the clamp ring part 14. This aids in pushing the clamp ring parts apart during cell disassembly and prevents loss of the clamp screw.

The manner of securement of the upper cell part to the carrier frame enables the relative location therebetween to be varied and thus adapted to different conditions.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A clamp assembly for a high pressure diaphragm test cell assembly comprising an upper cell part including a wedge flange and a lower cell part including a wedge flange, said clamp assembly comprising:
   a carrier frame including means for fixing said frame relative to a stationary support;
   means for securing said upper cell part to said carrier frame with the wedge flange of the upper cell part directed downwardly;
   a vertical carrier pin mounted on said carrier frame and extending downwardly therefrom;
   first and second clamp ring parts mounted at their rear ends to a lower end of said carrier pin for free swinging movement in a horizontal plane;
   said clamp ring parts each including clamp surfaces for engaging the wedge flanges of the cell parts; and,
   releasable fastening means engaging front ends of said clamp ring parts and extending tangentially relative thereto for forcing said clamp ring parts toward one another to press said cell parts firmly against one another.

2. A clamp assembly according to claim 1 wherein said securing means comprise means for securing a top surface of said upper cell part to said carrier frame.

3. A clamp assembly according to claim 1 wherein said securing means comprise a plurality of screws, said upper cell part including a plurality of screw-receiving apertures, said apertures being spaced at regular distances enabling said upper cell part to be connected at different angles relative to said carrier frame.

4. A clamp assembly according to claim 1 wherein said fastening means includes a clamping screw, said clamping screw being freely rotatably mounted in the front end of one of said clamp ring parts, and threadably secured in the front end of the other of said clamp ring parts, said clamping screw including means resisting relative axial movement of said clamping screw within said one clamp ring part.

5. A clamp assembly according to claim 4 wherein said last-named means comprises stop plates disposed on opposite sides of said one clamp ring part.

6. A clamp ring according to claim 1 including a horizontal tab mounted on said carrier pin for rotation in a horizontal plane; one of said clamp ring parts being mounted directly on said carrier pin, said tab including a journal spaced from said carrier pin for rotatably carrying the other clamp ring part.

7. In a clamp assembly for a high perssure diaphragm test cell assembly comprising an upper cell part including a wedge flange and a lower cell part including a wedge flange, the clamp assembly including means for clamping the upper and lower cell parts together, the improvement comprising:
   a stationary support;
   a carrier frame including means for fixing the carrier frame relative to the stationary support;
   means for securing said upper cell part to said carrier frame with the wedge flange of the upper cell part directed downwardly;
   a vertical carrier pin mounted on said carrier frame and extending downwardly therefrom;
   said means for clamping the upper and lower cell parts together including first and second clamp ring parts mounted at their rear ends to a lower end of said carrier pin for free swinging movement in a horizontal plane;
   said clamp ring parts each including clamp surfaces for engaging the wedge flanges of the cell parts; and,
   releasable fastening means engaging front ends of said clamp ring parts and extending tangentially relative thereto for forcing said clamp ring parts toward one another to press said cell parts firmly against one another.

8. A clamp and disphragm test cell assembly, comprising:
a high pressure diaphragm test cell including an upper cell part having a wedge flange and a lower cell part having a wedge flange;
a stationary support;
a carrier frame including means for fixing the carrier frame relative to the stationary support;
means for securing said upper cell part to said carrier frame with the wedge flange of the upper cell part directed downwardly; p1 a vertical carrier pin mounted on said carrier frame and extending downwardly therefrom;
first and second clamp ring parts mounted at their rear ends to a lower end of said carrier pin for free swinging movement in a horizontal plane;
said clamp ring parts each including clamp surfaces for engaging the wedge flanges of the cell parts; and,
releasable fastening means engaging front ends of said clamp rings parts and extending tangentially relative thereto for forcing said clamp ring parts toward one another to press said cell parts firmly against one another.

9. A clamp assembly for use with a high pressure diaphragm test cell assembly of the type comprising an upper cell part including a wedge flange and a lower cell part including a wedge flange, said clamp assembly comprising:
a carrier frame adapted to be fixed to a stationary support;
means for securing said upper cell part to said carrier frame including a plurality of screws, said upper cell part having a plurality of screw-receiving apertures, said apertures being spaced at regular distances enabling said upper cell part to be connected at different angles relative to said carrier frame;
a vertical carrier pin mounted on said carrier frame and extending downwardly therefrom;
first and second clamp ring parts mounted at their rear ends to a lower end of said carrier pin for free swinging movement in a horizontal plane;
said clamp ring parts each including clamp surfaces for engaging the wedge flanges of the cell parts; and,
releasable fastening means engaging front ends of said clamp ring parts and extending tangenetially relative thereto for forcing said clamp ring parts toward one another to press said cell parts firmly against one another.

10. A clamp assembly for use with a high pressure diaphragm test cell assembly of the type comprising an upper cell part including a wedge flange and a lower cell part including a wedge flange, said clamp assembly comprising:
a carrier frame adapted to be fixed to a stationary support;
means for securing said upper cell part to said carrier frame;
a vertical carrier pin mounted on said carrier frame and extending downwardly therefrom;
first and second clamp ring parts mounted at their rear ends to a lower end of said carrier pin for free swinging movement in a horizontal plane;
said clamp ring parts each including clamp surfaces for engaging the wedge flanges of the cell parts;
releasable fastening means engaging front ends of said clamp ring parts and extending tangentially relative thereto for forcing said clamp ring parts toward one another to press said cell parts firmly against one another;
a horizontal tab mounted on said carrier pin for rotation in a horizontal plane; and,
one of said clamp ring parts being mounted directly on said carrier pin;
said tab including a journal spaced from said carrier pin for rotatably carrying the other clamp ring part.

* * * * *